(12) United States Patent
Zhu et al.

(10) Patent No.: US 12,488,713 B2
(45) Date of Patent: Dec. 2, 2025

(54) ADAPTIVE CONTROL DEVICE, DISPLAY APPARATUS, AND ADAPTIVE CONTROL METHOD

(71) Applicant: BOE Technology Group Co., Ltd., Beijing (CN)

(72) Inventors: Jianwen Zhu, Beijing (CN); Binhua Sun, Beijing (CN); Feng Zi, Beijing (CN)

(73) Assignee: Beijing BOE Technology Development Co., Ltd., Beijing (CN)

( * ) Notice: Subject to any disclaimer, the term of this patent is extended or adjusted under 35 U.S.C. 154(b) by 0 days.

(21) Appl. No.: 18/578,520

(22) PCT Filed: Jan. 12, 2023

(86) PCT No.: PCT/CN2023/071902
§ 371 (c)(1),
(2) Date: Jan. 11, 2024

(87) PCT Pub. No.: WO2024/148562
PCT Pub. Date: Jul. 18, 2024

(65) Prior Publication Data
US 2025/0095521 A1    Mar. 20, 2025

(51) Int. Cl.
*G09G 3/00* (2006.01)
*G02B 27/01* (2006.01)
(Continued)

(52) U.S. Cl.
CPC ......... *G09G 3/001* (2013.01); *G02B 27/017* (2013.01); *G06F 3/011* (2013.01); *G09G 5/10* (2013.01);
(Continued)

(58) Field of Classification Search
CPC ....... G02B 27/01; G02B 27/017; G06F 3/011; G09G 3/001; G09G 3/34; G09G 5/10;
(Continued)

(56) References Cited

U.S. PATENT DOCUMENTS

| 10,687,717 B1 | 6/2020 | Peterson et al. |
| 2008/0218501 A1* | 9/2008 | Diamond ................ G09G 3/22 345/207 |

(Continued)

FOREIGN PATENT DOCUMENTS

| CN | 108766387 A | 11/2018 |
| CN | 109951594 A | 6/2019 |

(Continued)

OTHER PUBLICATIONS

International Search Report & Written Opinion mailed Sep. 18, 2023, regarding PCT/CN2023/071902.

*Primary Examiner* — Cory A Almeida
(74) *Attorney, Agent, or Firm* — Intellectual Valley Law, P.C.

(57) ABSTRACT

An adaptive control device includes one or more processors; one or more sensors coupled to the one or more processors; and one or more power sources coupled to the one or more processors. The one or more power sources are coupled to a display panel. The one or more sensors include a plurality of photosensors configured to detect ambient light intensities at a plurality of sampling orientations with respect to one or (Continued)

more view zones, respectively; and one or more position sensors configured to detect a reference angular position of the adaptive control device. The one or more processors are configured to determine a true orientation from which ambient light intensity signals are detected at a respective time point based on information on the plurality of sampling orientations with respect to one or more view zones, respectively, and the reference angular position of the adaptive control device.

20 Claims, 12 Drawing Sheets

(51) Int. Cl.
*G06F 3/01* (2006.01)
*G09G 3/34* (2006.01)
*G09G 5/10* (2006.01)

(52) U.S. Cl.
CPC ....... *G09G 3/34* (2013.01); *G09G 2320/0626* (2013.01); *G09G 2330/021* (2013.01); *G09G 2354/00* (2013.01); *G09G 2360/144* (2013.01)

(58) Field of Classification Search
CPC ..... G09G 2320/0626; G09G 2330/021; G09G 2354/00; G09G 2360/144
See application file for complete search history.

(56) References Cited

U.S. PATENT DOCUMENTS

| | | | |
|---|---|---|---|
| 2014/0184577 A1* | 7/2014 | Kim | G02F 1/172 345/207 |
| 2015/0245043 A1* | 8/2015 | Greenebaum | H04N 5/20 375/240.25 |
| 2016/0005362 A1* | 1/2016 | Chen | G09G 3/3406 345/690 |
| 2018/0012561 A1* | 1/2018 | Yoon | G09G 5/10 |
| 2018/0061344 A1* | 3/2018 | Kurokawa | G09G 3/3233 |
| 2021/0097959 A1* | 4/2021 | Kunitomo | G09G 3/002 |
| 2021/0304695 A1 | 9/2021 | Chen et al. | |
| 2021/0358453 A1 | 11/2021 | Sun et al. | |
| 2022/0291740 A1* | 9/2022 | Liu | G02C 7/021 |

FOREIGN PATENT DOCUMENTS

| | | |
|---|---|---|
| CN | 110930945 A | 3/2020 |
| CN | 110979156 A | 4/2020 |
| CN | 112034621 A | 12/2020 |
| CN | 114999421 A | 9/2022 |
| DE | 202018001210 U1 | 3/2018 |
| WO | 2017134629 A1 | 8/2017 |

\* cited by examiner

ADAPTIVE CONTROL DEVICE, DISPLAY APPARATUS, AND ADAPTIVE CONTROL METHOD

CROSS-REFERENCE TO RELATED APPLICATION

This application is a national stage application under 35 U.S.C. § 371 of International Application No. PCT/CN2023/071902, filed Jan. 12, 2023, the contents of which are incorporated by reference in the entirety.

TECHNICAL FIELD

The present invention relates to display technology, more particularly, to an adaptive control device, a display apparatus, and an adaptive control method.

BACKGROUND

Virtual reality and augmented reality are two computer technologies for viewing synthetic or partially synthetic environments. Virtual reality typically involves computer generated representations of various real-world or fictitious environments. Augmented reality typically involves various types of computer-assisted representations of the real world. Typically, augmented reality refers to a live direct or indirect view of a physical, real-world environment whose elements are augmented (or supplemented) by computer-generated sensory input such as sound, video, graphics or GPS data. It is related to a more general concept called mediated reality, in which a view of reality is modified (possibly even diminished rather than augmented), by a computer.

SUMMARY

In one aspect, the present disclosure provides an adaptive control device, comprising one or more processors; one or more sensors coupled to the one or more processors; and one or more power sources coupled to the one or more processors; wherein the one or more power sources are coupled to a display panel; wherein the one or more sensors comprise a plurality of photosensors configured to detect ambient light intensities at a plurality of sampling orientations with respect to one or more view zones, respectively; and one or more position sensors configured to detect a reference angular position of the adaptive control device; wherein the one or more processors are configured to determine a true orientation from which ambient light intensity signals are detected at a respective time point based on information on the plurality of sampling orientations with respect to one or more view zones, respectively, and the reference angular position of the adaptive control device.

Optionally, the one or more processors are further configured to determine a driving mode for a present interval of a plurality of intervals; the one or more power sources are further coupled to a light modulator; the driving mode for a present interval is selected from a plurality of candidate driving modes; the plurality of candidate driving modes comprise adjusting brightness of light emitted from the display panel, adjusting light transmission rate of the light modulator coupled to the adaptive control device, and adjusting both the brightness of light emitted from the display panel and the light transmission rate of the light modulator.

Optionally, the one or more processors are further configured to predict a driving mode for a next interval of a plurality of intervals; wherein the one or more power sources comprises a first set of power sources configured to drive adjustment in a present interval of the plurality of intervals; and a second set of power sources configured to be pre-set to a state for driving adjustment in the next interval.

Optionally, the one or more processors are further configured to transmit a first signal to a first power source of the one or more power sources based on a driving mode for a present interval, and transmit a second signal to a second power source of the one or more power sources based on a predicted driving mode for a next interval; wherein, upon receiving the first signal from the one or more processors, the first power source is configured to adjust voltages required for adjusting brightness of the light emitted from the display panel or light transmission rate of a light modulator according to the driving mode for the present interval, thereby adjusting the brightness of the light emitted from the display panel or the light transmission rate of the light modulator in the present interval; and upon receiving the second signal from the one or more processors, the second power source is configured to be pre-set to voltages required for adjusting the brightness of the light emitted from the display panel or the light transmission rate of the light modulator according to the predicted driving mode for the next interval.

Optionally, when prediction on the driving mode for the next interval does not occur, the one or more processors are configured to determine an updated driving mode for the next interval; upon determination of the updated driving mode for the next interval, the one or more processors are configured to transmit a first updated signal to the first power source; and the first power source is configured to generate a voltage based on the first updated signal, and output the voltage to the display panel for adjusting brightness of light emitted from the display panel or to the light modulator for adjusting the light transmission rate of the light modulator.

Optionally, when prediction on the driving mode for the next interval occurs, the one or more processors are configured to, consistent with the prediction, determine a driving mode for the next interval; upon determination of the driving mode for the next interval, the one or more processors are configured to transmit a second signal to the second power source; and the second power source is configured to generate a voltage based on the second signal, and output the voltage to the display panel for adjusting brightness of light emitted from the display panel or to the light modulator for adjusting the light transmission rate of the light modulator.

Optionally, the one or more processors are further configured to predict a driving mode subsequent to the driving mode for the next interval; when prediction on the driving mode subsequent to the driving mode for the next interval does not occur, the one or more processors are configured to determine an updated driving mode subsequent to the driving mode for the next interval; upon determination of the updated driving mode subsequent to the driving mode for the next interval, the one or more processors are configured to transmit a second updated signal to a second power source; and the second power source is configured to generate a voltage based on the second updated signal, and output the voltage to the display panel for adjusting brightness of light emitted from the display panel.

Optionally, the one or more processors are further configured to predict a driving mode subsequent to the driving mode for the next interval; when prediction on the driving mode subsequent to the driving mode for the next interval occurs, the one or more processors are configured to, consistent with the prediction, determine a driving mode subsequent to the driving mode for the next interval; upon determination of the driving mode subsequent to the driving mode for the next interval, the one or more processors are configured to transmit a third updated signal to a first power source; and the first power source is configured to generate a voltage based on the third updated signal, and output the voltage to the display panel for adjusting brightness of light emitted from the display panel.

Optionally, the one or more processors are further configured to transmit a signal to the one or more power sources based on driving mode for a present interval and/or a predicted driving mode for a next interval; and upon receiving the signal, the one or more power sources are configured to output a voltage signal required for adjusting the light transmission rate of the light modulator according to the driving mode for the present interval and/or the predicted driving mode for the next interval, thereby adjusting the light transmission rate of the light modulator in the present interval and/or the next interval.

Optionally, the one or more processors are further configured to determine a driving mode for a present interval of the plurality of intervals; and upon determination the driving mode for the present interval requires an increase in light transmission rate of the light modulator, the one or more power sources are configured to generate a negative voltage signal and output the negative voltage signal to the light modulator to increase the light transmission rate of the light modulator.

Optionally, when a target light transmission rate of the light modulator is achieved, the one or more power sources are configured to generate a positive voltage signal and output the positive voltage signal to the light modulator; and the positive voltage signal has a duty cycle required to maintain the target light transmission rate.

Optionally, the one or more processors are further configured to determine a driving mode for a present interval of the plurality of intervals; and upon determination the driving mode for the present interval requires a decrease in light transmission rate of the light modulator, the one or more power sources are configured to generate a first positive voltage signal and output the first positive voltage signal to the light modulator to decrease the light transmission rate of the light modulator.

Optionally, when a target light transmission rate of the light modulator is achieved, the one or more power sources are configured to generate a second positive voltage signal and output the second positive voltage signal to the light modulator; the second positive voltage signal has a duty cycle required to maintain the target light transmission rate; and the first positive voltage signal has a duty cycle higher than the duty cycle of the second positive voltage signal.

Optionally, the one or more power sources comprises a third power source and a fourth power source; the third power source is configured to generate a positive voltage signal and output the positive voltage signal to the light modulator to decrease the light transmission rate of the light modulator; and the fourth power source is configured to generate a negative voltage signal and output the negative voltage signal to the light modulator to increase the light transmission rate of the light modulator.

Optionally, the one or more power sources comprises a third power source and a fourth power source; the third power source is configured to generate a maintaining voltage signal and output the maintaining voltage signal to the light modulator to maintain the light transmission rate of the light modulator at a target light transmission rate; and the fourth power source is configured to output voltages required for adjusting the light transmission rate of the light modulator according to the driving mode for the present interval and/or the predicted driving mode for the next interval, thereby adjusting the light transmission rate of the light modulator in the present interval and/or the next interval.

Optionally, the one or more processors are further configured to derive a denoised ambient light intensity in a respective interval of a plurality of intervals; the respective interval comprises I number of sampling intervals; a respective sampling interval of the I number of sampling intervals comprises J number of sampling sub-intervals, I and J being a positive integer; and the one or more processors are further configured to calculate I number of arithmetic mean ambient light intensities of the I number of sampling intervals, respectively; and configured to calculate a weighted mean of the I number of arithmetic mean ambient light intensities based on a total number of ambient light intensity values used for calculating a respective arithmetic mean ambient light intensity in each of the I number of sampling intervals.

Optionally, the one or more processors are further configured to establish an azimuth matrix, and configured to map denoised ambient light intensities to the azimuth matrix, thereby establishing an ambient light intensity domain of a scene in which the adaptive control device is located; obtain information of the respective time point at which a respective ambient light intensity signal is collected by a respective photosensor of the plurality of photosensors; and map the respective ambient light intensity signal to the azimuth matrix by identifying the respective time point at which the respective ambient light intensity signal is collected and at which a reference angular position data signal is collected by the one or more position sensors.

Optionally, the one or more processors are further configured to predict a driving mode for a next interval of a plurality of intervals based on images of historically viewed contents stored in the adaptive control device and an image of currently viewed contents; the one or more processors are configured to predict a content that the user is likely to view in the next interval, and configured to predict a gaze direction of the user in the next interval based on prediction of the content that the user is likely to view in the next interval; and based on the gaze direction predicted, the one or more processors are configured to predict an ambient light intensity in the next interval.

In another aspect, the present disclosure provides a display apparatus, comprising the adaptive control device described herein, a display panel coupled to the adaptive control device, and a light modulator coupled to the adaptive control device.

In another aspect, the present disclosure provides an adaptive control method, comprising coupling one or more sensors to one or more processors; coupling one or more power sources to the one or more processors; detecting, by a plurality of photosensors, ambient light intensities at a plurality of sampling orientations with respect to one or more view zones, respectively; detecting, by the one or more position sensors, a reference angular position; and determining, by the one or more processors, a true orientation from which ambient light intensity signals are detected at a respective time point based on information on the plurality of sampling orientations with respect to one or more view zones, respectively, and the reference angular position.

BRIEF DESCRIPTION OF THE FIGURES

The following drawings are merely examples for illustrative purposes according to various disclosed embodiments and are not intended to limit the scope of the present invention.

DETAILED DESCRIPTION

Figure 1:
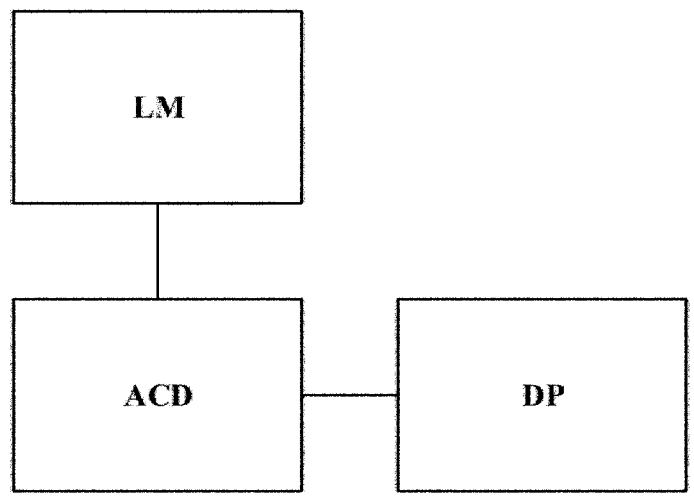
FIG. 1 is a schematic diagram illustrating the structure of a display apparatus in some embodiments according to the present disclosure.

The disclosure will now be described more specifically with reference to the following embodiments. It is to be noted that the following descriptions of some embodiments are presented herein for purpose of illustration and description only. It is not intended to be exhaustive or to be limited to the precise form disclosed.

In related augmented reality display apparatuses, an image of a virtual object is produced by a display panel. The image of the virtual object is transmitted through a waveguide to a user's eye for displaying a virtual image. The virtual image is overlaid on a view of a real-world environment, allowing the user to view an augmented reality. The inventors of the present disclosure discover that, due to brightness of the display panel and the optical transmission efficiency of the waveguide, the virtual image viewed by the user typically is low in brightness. The inventors of the present disclosure discover that it is difficult for a user to view the virtual image with reasonable clarity when the user is using the augmented reality display apparatuses in an outdoor scenario, such as outdoor inspection or fire rescue, where the ambient light intensity is typically very high.

Accordingly, the present disclosure provides, inter alia, an adaptive control device, a display apparatus, and an adaptive control method that substantially obviate one or more of the problems due to limitations and disadvantages of the related art. In one aspect, the present disclosure provides an adaptive control device. In some embodiments, the adaptive control device includes one or more processors; one or more sensors coupled to the one or more processors; and one or more power sources coupled to the one or more processors. Optionally, the one or more power sources are coupled to a display panel. Optionally, the one or more sensors include a plurality of photosensors configured to detect ambient light intensities at a plurality of sampling orientations with respect to one or more view zones, respectively; and one or more position sensors configured to detect a reference angular position of the adaptive control device. Optionally, the one or more processors are configured to determine a true orientation from which ambient light intensity signals are detected at a respective time point based on information on the plurality of sampling orientations with respect to one or more view zones, respectively, and the reference angular position of the adaptive control device.

The inventors of the present disclosure discover that a light screen can be added to control light intensity of the view of the real-world environment entering into a view zone. By lowering the light intensity of the view of the real-world environment entering into the view zone, the contrast for the virtual image can be increased. Moreover, the brightness of light emitted from the display panel can also be increased to further enhance the contract for the virtual image.

The inventors of the present disclosure discover that, by increasing the brightness of light emitted from the display panel, power consumption of the display panel increases significantly, accompanied by generation of excess heat when the display panel is operated for an elongated period of time. The augmented reality display apparatus typically has a miniaturized and light-weight design, which is not conducive to heat dissipation. Accumulation of excess heat in the augmented reality display apparatus could result in display abnormalities. Moreover, the inventors of the present disclosure discover that, though a light screen is effective in lowering the light intensity of the view of the real-world environment entering into the view zone, the related augmented reality display apparatus is not suitable for use in other scenarios. For example, in a scenario in which the ambient light intensity is low, having a light screen severely affects the user's ability to view the real-world environment.

The inventors of the present disclosure discover that the unique structure of the present adaptive control device and the present augmented reality display apparatus enables a user to view the augmented reality in various scenarios with various ambient light intensities.

FIG. 1 is a schematic diagram illustrating the structure of a display apparatus in some embodiments according to the present disclosure. Referring to FIG. 1, the display apparatus in some embodiments includes a display panel DP connected to an adaptive control device ACD. The adaptive control device ACD is configured to adaptively adjust brightness of light emitted from the display panel DP based on ambient light intensity.

Figure 2:
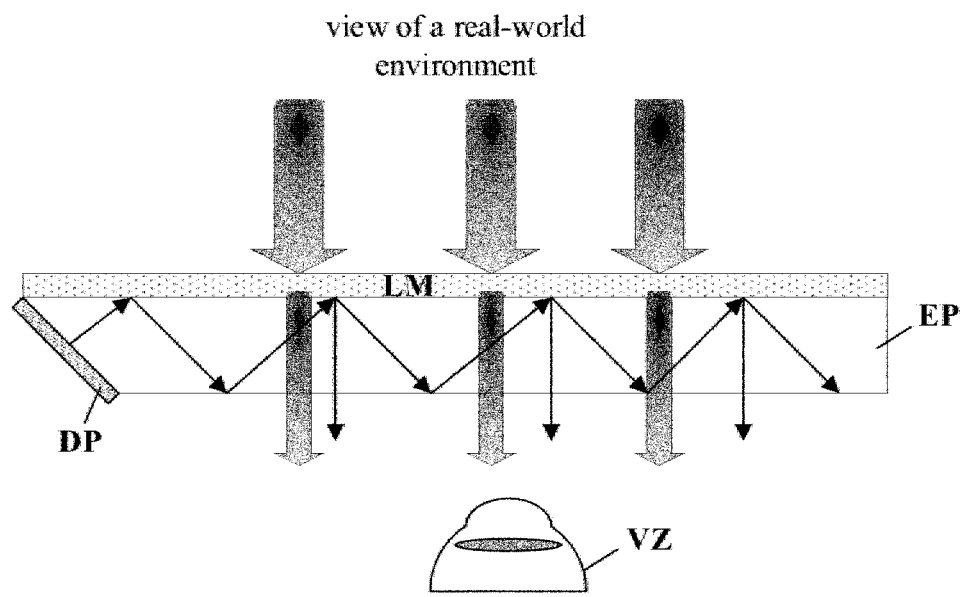
FIG. 2 is a schematic diagram illustrating the structure of a display apparatus in some embodiments according to the present disclosure.

In some embodiments, the display apparatus is an augmented reality display apparatus configured to display an image of a virtual object overlaid on a view of a real-world environment. FIG. 2 is a schematic diagram illustrating the structure of a display apparatus in some embodiments according to the present disclosure. Referring to FIG. 2, the display apparatus in some embodiments includes a display panel DP configured to display an image of a virtual object. The image displayed by the display panel DP is transmitted to a view zone VZ (e.g., a pupil of a user) through an eyepiece EP. In one example, the eyepiece EP is a waveguide. The image of the virtual object is overlaid on a view of a real-world environment, allowing the user to view an augmented reality. Optionally, the display apparatus further includes a light modulator LM configured to control light intensity of the view of the real-world environment entering into a view zone.

In some embodiments, referring to FIG. 1 and FIG. 2, the adaptive control device ACD is configured to adaptively adjust a light transmission rate of the light modulator LM based on ambient light intensity. By adaptively adjusting the light transmission rate of the light modulator LM, a light intensity of the view of the real-world environment entering into the view zone VZ can be adaptively adjusted based on ambient light intensity.

Figure 3:
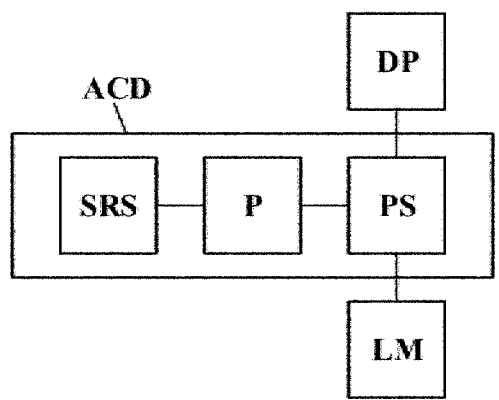
FIG. 3 is a schematic diagram illustrating the structure of an adaptive control device in some embodiments according to the present disclosure.

FIG. 3 is a schematic diagram illustrating the structure of an adaptive control device in some embodiments according to the present disclosure. Referring to FIG. 3, the adaptive control device ACD in some embodiments includes one or more processors P, one or more sensors SRS coupled to the one or more processors P, and one or more power sources PS coupled to the one or more processors P. Optionally, the one or more power sources PS are coupled to the display panel DP. Optionally, the one or more power sources PS are coupled to the light modulator LM.

Figure 4:
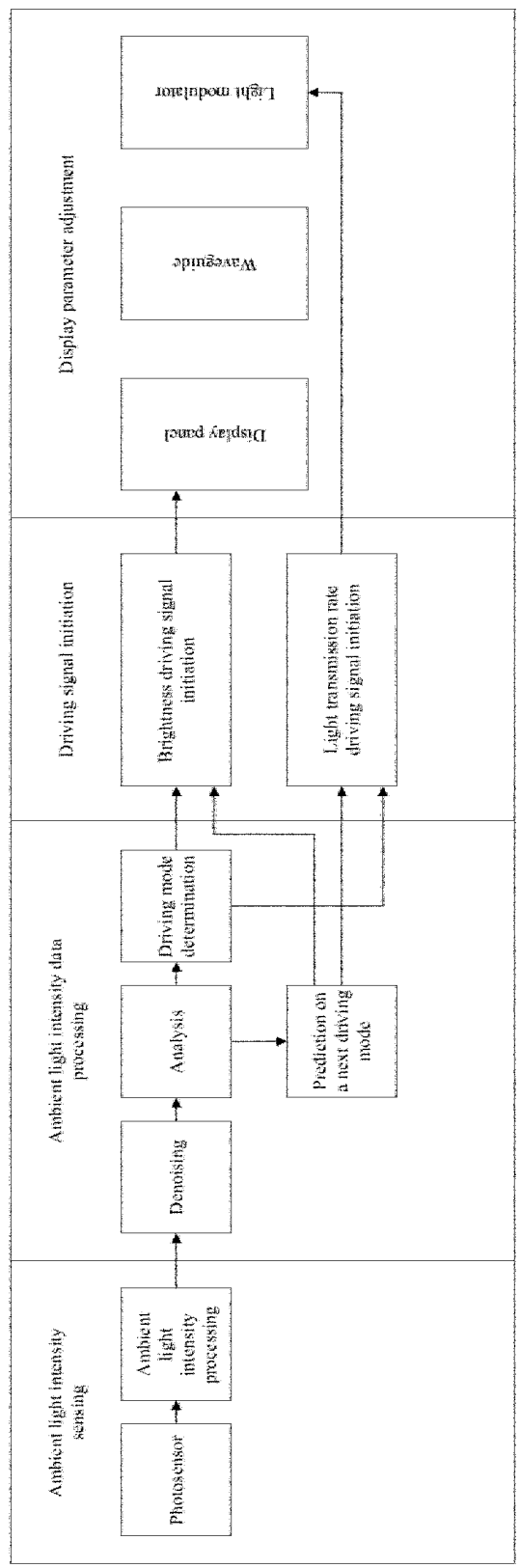
FIG. 4 is a block diagram illustrating an operation of an adaptive control device in some embodiments according to the present disclosure.
Figure 5:
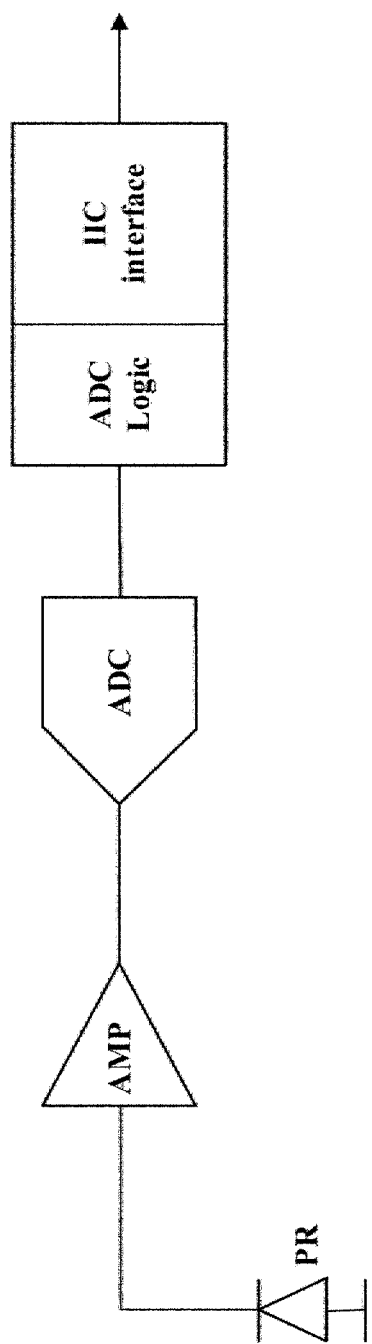
FIG. 5 is a circuit diagram of an ambient light intensity detection and processing device in some embodiments according to the present disclosure.

FIG. 4 is a block diagram illustrating an operation of an adaptive control device in some embodiments according to the present disclosure. Referring to FIG. 4, the operation first includes ambient light intensity sensing. The ambient light intensity sensing includes detecting ambient light intensity using a photosensor, and processing ambient light intensity signals detected by the photosensor. FIG. 5 is a circuit diagram of an ambient light intensity detection and processing device in some embodiments according to the present disclosure. Referring to FIG. 5, the ambient light intensity detection and processing device in some embodiments includes a photosensor PR (e.g., a photodiode) configured to detect ambient light intensity. The ambient light intensity detection and processing device in some embodiments further includes an amplifier AMP configured to amplify ambient light intensity signals from the photosensor PR, the ambient light intensity signals being analog signals. The ambient light intensity detection and processing device in some embodiments further includes an analog-to-digital converter ADC configured to convert analog signals from the amplifier AMP into digital signals. In one example, the digital signals are transmitted to one or more processors through an ADC logic and IIC interface.

In some embodiments, the adaptive control device in some embodiments includes a plurality of photosensors configured to detect ambient light intensities at a plurality of sampling orientations with respect to one or more view zones (e.g., one or more pupils of a user), respectively. In some embodiments, an X-plane containing a user's eyes is divided based on azimuth angles into m regions, a Y-plane containing a user's eyes is divided based on azimuth angles into n regions, resulting in m×n sampling orientations, m and n being positive integers. In one example, a five-point sampling method may be used to derive 5×5 sampling orientations, m=5, and n=5.

In some embodiments, the plurality of photosensors may be set to detect ambient light intensities along the m×n sampling orientations. Among the m×n sampling orientations, a horizontal forward sampling orientation may be assigned as a main orientation, and other sampling orientations may be auxiliary orientations. A photosensor configured to detect ambient light intensity in the main orientation may be assigned as a main photosensor, ambient light intensity signals collected by the main photosensor have the greatest weight in adaptive adjustment of the parameters of the display apparatus such as the brightness of light emitted from the display panel and the light transmission rate of the light modulator. Ambient light intensity signals collected by each of the auxiliary photosensors have smaller weight in adaptive adjustment of the parameters of the display apparatus. On the other hand, the ambient light intensity signals collected by each of the auxiliary photosensors have greater weight in prediction of ambient light intensity in a next time period.

Referring to FIG. 3 to FIG. 5, the analog-to-digital converter ADC is configured to convert analog signals from the amplifier AMP into digital signals, which are transmitted to one or more processors through an ADC logic and IIC interface. The one or more processor (e.g., a micro-controller) is configured to obtain an identification number of a respective photosensor from a respective ambient light intensity signal transmitted through the IIC interface to determine from which sampling orientation the ambient light intensity signals are detected. Optionally, the one or more processor is further configured to obtain information (e.g., a time stamp) of a time point at which the respective ambient light intensity signal is collected.

In some embodiments, the adaptive control device further includes a position sensor (e.g., an angular position sensor such as a gyroscope) configured to detect a reference angular position of the adaptive control device. The position sensor is configured to output a reference angular position data signal. Optionally, the reference angular position data signal contains a reference angular position of the adaptive control device at a respective time point, and information of the respective time point at which the reference angular position data signal is collected. By having the information on the sampling orientation (with respect to the one or more view zones) from which the ambient light intensity signals are detected at the respective time point, and the information on the reference angular position of the adaptive control device at the respective time point, the one or more processors are configured to determine a true orientation from which the ambient light intensity signals are detected at the respective time point, facilitating further analysis to be conducted by the one or more processors.

Referring to FIG. 4, the operation of the adaptive control device in some embodiments further includes ambient light intensity data processing. The ambient light intensity data processing in some embodiments includes at least one of denoising, analysis, driving mode determination, or prediction.

In some embodiments, the one or more processors are configured to denoise the ambient light intensity signals. The noise in the ambient light intensity signals includes an intrinsic noise due to induction fluctuation of a photosensor material in a respective photosensor of the plurality of photosensors, and an extrinsic noise due to irradiation of an external line light source in the environment. The presence of the external line light source largely does not affect a viewing experience of a user; however, it produces noise in the ambient light intensity signals, thus adversely affects the adaptive adjustment of the display apparatus. The intrinsic noise and the extrinsic noise both have the characteristics of an impulse noise, e.g., being transient and impulsive.

Figure 6:
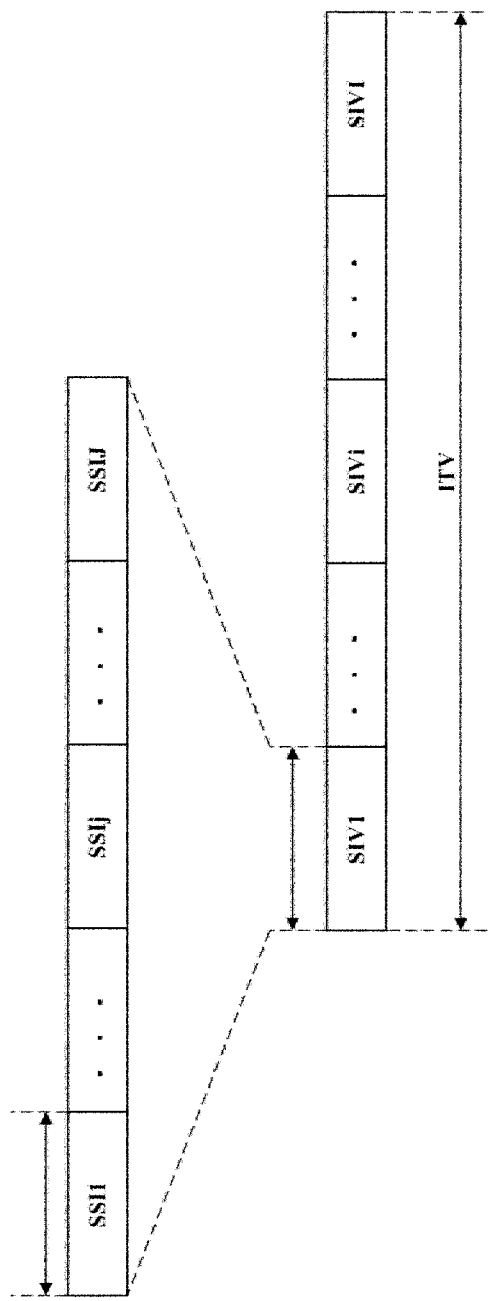
FIG. 6 illustrates a process of deriving a denoised ambient light intensity in a respective interval of a plurality of intervals.

In some embodiments, the one or more processors are configured to derive a denoised ambient light intensity in a respective interval of a plurality of intervals. FIG. 6 illustrates a process of deriving a denoised ambient light intensity in a respective interval of a plurality of intervals. Referring to FIG. 6, the respective interval of the plurality of intervals ITV in some embodiments includes I number of sampling intervals (e.g., SIV1, . . . , SIVi, . . . , SIVI), I being a positive integer. Optionally, a respective sampling interval of the I number of sampling intervals includes J number of sampling sub-intervals (e.g., SSI1, . . . , SSIj, . . . , SSIJ), J being a positive integer.

In some embodiments, the one or more processors are further configured to calculate I number of arithmetic mean ambient light intensities of the I number of sampling intervals, respectively; and configured to calculate a weighted mean of the I number of arithmetic mean ambient light intensities based on a total number of ambient light intensity values used for calculating a respective arithmetic mean ambient light intensity in each of the I number of sampling intervals.

In some embodiments, ambient light intensity is sampled in each of the J number of sampling sub-intervals. In some embodiments, the one or more processors are configured to compare values of J number of ambient light intensities sampled in the J number of sampling sub-intervals with a threshold value; and determine whether any of the values of the J number of ambient light intensities sampled in the J number of sampling sub-intervals is greater than the threshold value. Upon determination one or more first values of the values of the J number of ambient light intensities sampled in the J number of sampling sub-intervals is greater than the threshold value, the one or more first values are determined as abnormal values. Upon determination one or more second values of the values of the J number of ambient light intensities sampled in the J number of sampling sub-intervals is equal to or less than the threshold value, the one or more second values are determined as normal values.

In some embodiments, the one or more processors are further configured to obtain an arithmetic mean of the one or more second values, and assign the arithmetic mean of the one or more second values as a respective arithmetic mean ambient light intensity of the J number of sampling sub-intervals in a respective sampling interval of the I number of sampling intervals.

In some embodiments, the one or more processors are further configured to obtain a median value of I number of ambient light intensities sampled in the I number of sampling intervals. Optionally, the one or more processors are configured to obtain the median value using a sorting algorithm. Optionally, the threshold value is correlated to the median value. Optionally, the threshold value is k*(the median value), wherein k is greater than 1. In one example, k=1.5.

Referring to FIG. 4, once the ambient light intensity data is denoised, the one or more processors are configured to analyze the denoised data ("Analysis"). Because the ambient light intensities detected by the plurality of photosensors are detected at a plurality of sampling orientations with respect to one or more view zones, denoised ambient light intensities need to be mapped to real world orientations. In some embodiments, the adaptive control device further includes a position sensor (e.g., a gyroscope and/or a geo-magnetometer) configured to determine a real-world position (e.g., an angular position) of the adaptive control device. In some embodiments, the one or more processors are configured to establish an azimuth matrix (e.g., a two-dimensional azimuth matrix), and configured to map the denoised ambient light intensities to the azimuth matrix, thereby establishing an ambient light intensity domain of a scene in which the adaptive control device is located. The mapping operation is performed for any interval of the plurality of intervals during the ambient light intensities are collected. An example of the azimuth matrix is provided in Table 1.

TABLE 1

An azimuth matrix for mapping the denoised ambient light intensities.

| ambient light intensities | Horizontal angle 0° | Horizontal angle 72° | Horizontal angle 144° | Horizontal angle 216° | Horizontal angle 288° |
| --- | --- | --- | --- | --- | --- |
| Vertical angle 0° | | | | | |
| Vertical angle 36° | | | | | |
| Vertical angle 72° | | | | | |
| Vertical angle 108° | | | | | |
| Vertical angle 144° | | | | | |

As discussed previously, the one or more processors are further configured to obtain information (e.g., a time stamp) of a respective time point at which a respective ambient light intensity signal is collected by a respective photosensor. The one or more processors are further configured to map the respective ambient light intensity signal to the azimuth matrix by identifying a respective time point at which the respective ambient light intensity signal is collected and at which a reference angular position data signal is collected by the position sensor. The one or more processors are further configured to store a mapped azimuth matrix in an address-specific memory for subsequent calls.

Referring to FIG. 4, ambient light intensity data processing in some embodiments further includes driving mode determination. In some embodiments, the one or more processors are further configured to determine a driving mode for a present interval of the plurality of intervals. Optionally, the one or more processors are configured to determine the driving mode for the present interval of the plurality of intervals based on an evaluation of a driving mode for a previous interval of the plurality of intervals. In some embodiments, the driving mode is selected from a plurality of candidate driving modes. Examples of the plurality of candidate driving modes include adjusting brightness of light emitted from the display panel, adjusting light transmission rate of the light modulator, and adjusting both the brightness of light emitted from the display panel and the light transmission rate of the light modulator. Additional examples of driving modes include a first adjusting duration during which the brightness of light emitted from the display panel is adjusted and a second adjusting duration during which the light transmission rate of the light modulator is adjusted. In one example, the first adjusting duration is a duration during which a gamma correction voltage is applied to a data driving circuit of the display panel.

In some embodiments, the driving mode for the present interval of the plurality of intervals may be determined based on empirical data. For example, optimal driving modes for different age groups, different genders, different ethnicities, different vision conditions, respectively, may be determined empirically. The optimal driving modes for different age groups, different genders, different ethnicities, different vision conditions may be stored in a memory (e.g., a flash memory), and are available for the one or more processors to access in the process of determining the operation mode.

Figure 7:
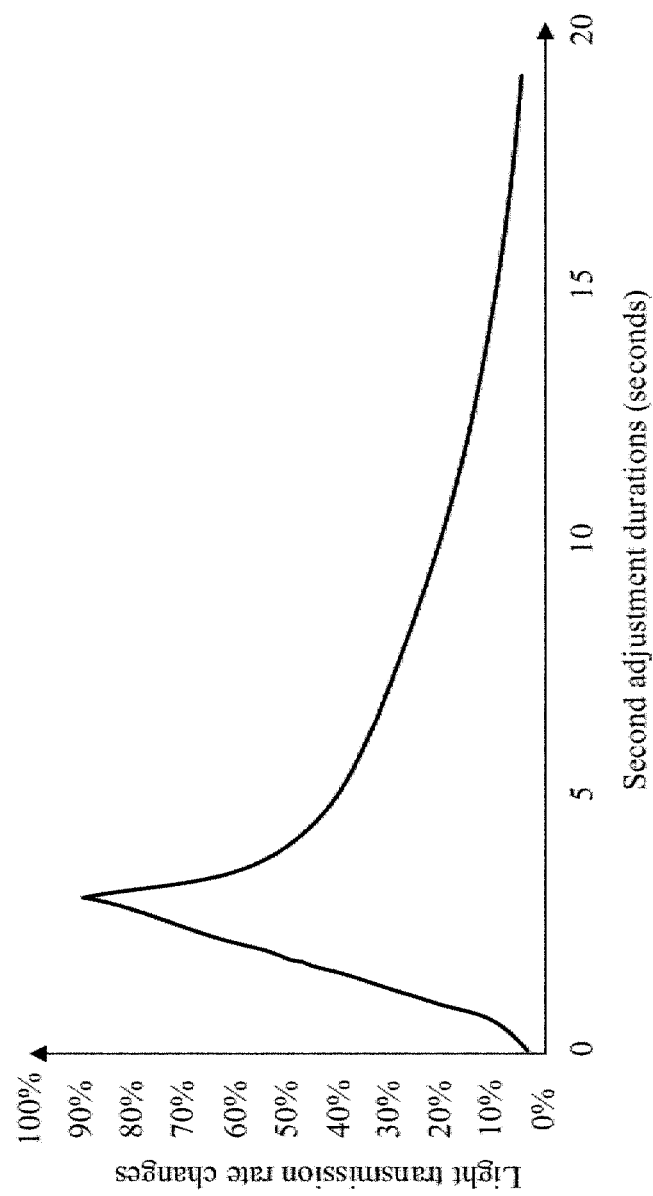
FIG. 7 shows an example of second adjusting durations corresponding to various light transmission rate changes for various population groups.

In some embodiments, the plurality of candidate driving modes further include a smooth adjusting mode and a fast-adjusting mode. In the smooth adjusting mode, the first adjusting duration and/or the second adjusting duration are longer as compared to their counterparts in a fast-adjusting mode. The smooth adjusting mode may be selected to allow sufficient time for the user to adapt to the adjustment. The fast-adjusting mode may be selected when the user is in a complex and fast changing environment. Depending on the user's viewing habits and tolerance to adjustment speed, the smooth adjusting mode or the fast-adjusting mode may be selected by a user, to avoid discomfort when the user is viewing augmented reality. Table 2 shows an example of first adjusting durations corresponding to various different combinations of brightness of light emitted from the display panel in the previous interval and the present interval. FIG. 7 shows an example of second adjusting durations corresponding to various light transmission rate changes for various population groups.

TABLE 2

An example of first adjusting durations corresponding to various different combinations of brightness of light emitted from the display panel in the previous interval and the present interval.

| First adjustment duration (seconds) | Brightness of light emitted from the display panel in the present interval | | | | | |
|---|---|---|---|---|---|---|
| Brightness of light emitted from the display panel in the previous interval | — | 0.1 | 2.1 | 2.1 | 2.1 | 2.1 |
| | 0.1 | — | 1.1 | 2.1 | 2.1 | 2.1 |
| | 1.1 | 1.1 | — | 0.1 | 2.1 | 2.1 |
| | 2.1 | 2.1 | 0.1 | — | 1.1 | 1.1 |
| | 2.1 | 2.1 | 2.1 | 1.1 | — | 0.1 |
| | 2.1 | 2.1 | 2.1 | 2.1 | 0.1 | — |

Referring to FIG. 4, ambient light intensity data processing in some embodiments further includes prediction on a driving mode for a next interval. Because adjustment of brightness of light emitted from the display panel and adjustment of light transmission rate of the light modulator takes time to complete (e.g., the first adjustment duration and the second adjustment duration), the inventors of the present disclosure discover that user viewing experience can be significantly improved if delay in the adjustments can be reduced. In some embodiments, the adaptive control device further includes at least two sets of power sources (e.g., two sets of batteries). A first set of power sources is configured to drive adjustment in the present interval. A second set of power sources is configured to be pre-set to a state for driving adjustment in a next interval of the plurality of intervals. When the adjustment in the next interval deviates from the adjustment in the present interval, the second set of power sources seamlessly takes over to drive the adjustment in the next interval, obviating a delay in setting the power sources to the state for driving the adjustment in the next interval. A smoother switching between the present interval and the next interval is achieved.

In some embodiments, the prediction on the driving mode for the next interval is performed based on images of historically viewed contents stored in the adaptive control device and an image of currently viewed contents. In one example, the content refers to a view of the real-world environment and/or the image of the virtual object, or a combination thereof in an augmented display apparatus. In some embodiments, the one or more processors are configured to predict a content that the user is likely to view in the next interval, and configured to predict a gaze direction of the user in the next interval based on prediction of the content that the user is likely to view in the next interval. Optionally, based on the gaze direction predicted, the one or more processors are configured to predict an ambient light intensity in the next interval. Optionally, the second set of power sources is configured to be pre-set to a state for driving adjustment according to the predicted ambient light intensity in the next interval.

Referring to FIG. 4, the operation of the adaptive control device in some embodiments further includes driving signal initiation. The driving signal initiation in some embodiments includes at least one of brightness driving signal initiation or light transmission rate driving signal initiation. As shown in FIG. 4, the brightness driving signal initiation is based on the results of the driving mode determination (for the present interval) and/or the prediction on the next driving mode (for the next interval). Similarly, the light transmission rate driving signal initiation is based on the results of the driving mode determination (for the present interval) and/or the prediction on the next driving mode (for the next interval).

Figure 8:
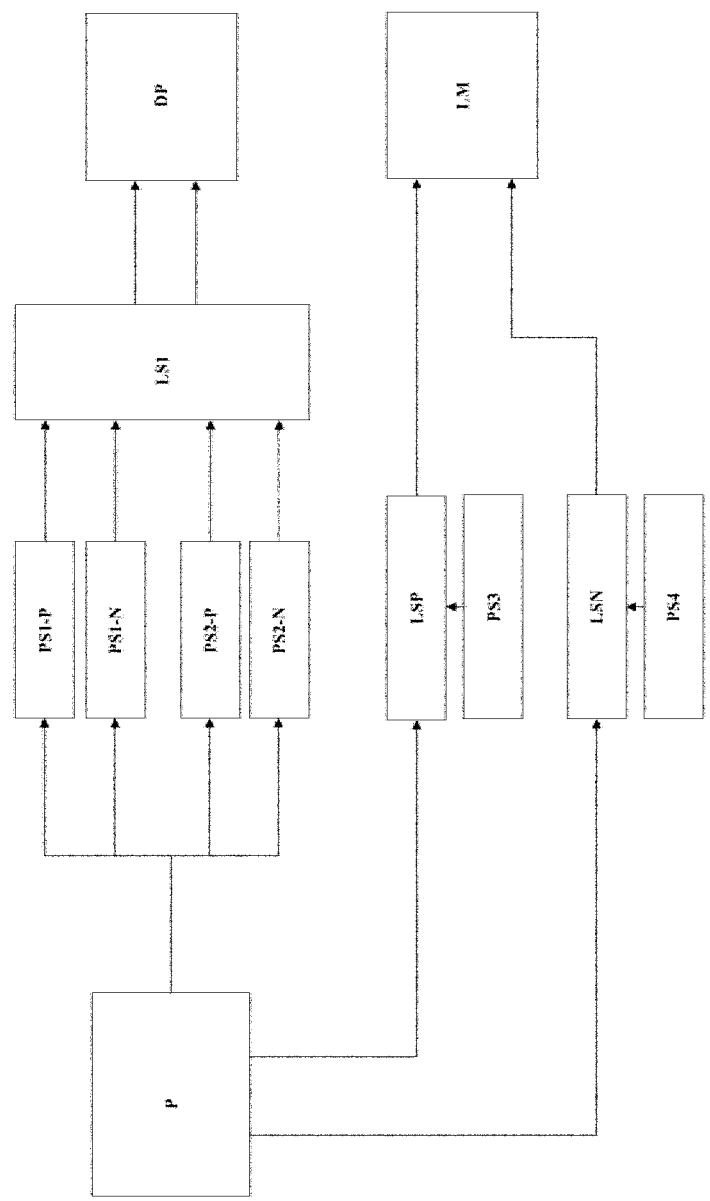
FIG. 8 is a schematic diagram illustrating driving signal initiation by an adaptive control device in some embodiments according to the present disclosure.

FIG. 8 is a schematic diagram illustrating driving signal initiation by an adaptive control device in some embodiments according to the present disclosure. Referring to FIG. 8, the adaptive control device in some embodiments includes one or more processors P, a first power source coupled to the one or more processors P, a second power source coupled to the one or more processors P, and a first load switch LS1 coupled to the first power source and the second power source. The load switch LS1 is configured to control connection or disconnection between the first power source and the display panel DP, and configured to control connection or disconnection between the second power source and the display panel DP. As shown in FIG. 8, the first power source includes a first anode PS1-P and a first cathode PS1-N; and the second power source includes a second anode PS2-P and a second cathode PS2-N.

In some embodiments, the first power source is first power management integrated circuit, and the second power source is a portion of a second power management integrated circuit.

Optionally, the first load switch is coupled to a data driving integrated circuit of the display panel DP.

Referring to FIG. 8, the adaptive control device in some embodiments further includes a third power source load switch LSP coupled to the one or more processors P, a fourth power source load switch LSN coupled to the one or more processors P, a third power source PS3 coupled to the third power source load switch LSP, and a fourth power source PS4 coupled to the fourth power source load switch LSN. The third power source load switch LSP is configured to control connection or disconnection between the third power source PS3 and the light modulator LM. The fourth power source load switch LSN is configured to control connection or disconnection between the fourth power source PS4 and the light modulator LM.

In some embodiments, the third power source PS3 includes a low dropout regulator. In some embodiments, the fourth power source PS4 includes a low dropout regulator.

Figure 9:
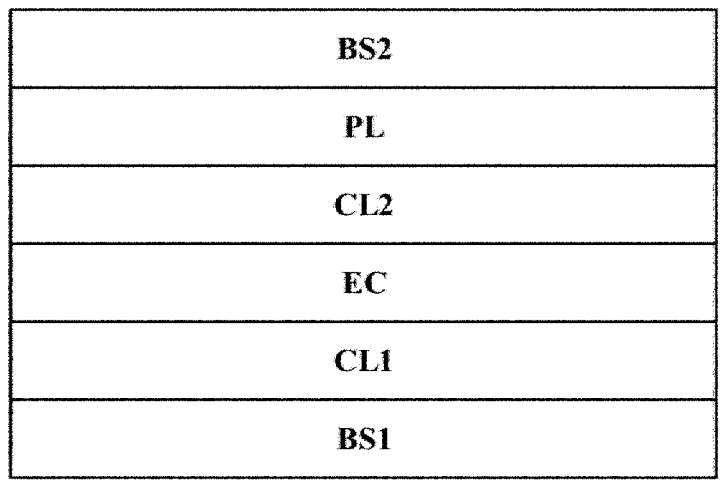
FIG. 9 is a schematic diagram illustrating the structure of a light modulator in some embodiments according to the present disclosure.

FIG. 9 is a schematic diagram illustrating the structure of a light modulator in some embodiments according to the present disclosure. Referring to FIG. 9, the light modulator in some embodiments includes a first conductive layer CL1 (e.g., a transparent first conductive layer), an electrochromic layer EC on the first conductive layer CL1, and a second conductive layer CL2 (e.g., a transparent second conductive layer) on a side of the electrochromic layer EC away from the first conductive layer CL1. One of the first conductive layer CL1 and the second conductive layer CL2 is coupled to the third power source load switch LSP and/or the fourth power source load switch LSN depicted in FIG. 8. Optionally, another one of the first conductive layer CL1 and the second conductive layer CL2 is provided with a common voltage (e.g., a ground voltage).

Optionally, the light modulator further includes a first base substrate BS1 on a side of the first conductive layer CL1 away from the electrochromic layer EC. Optionally, the light modulator further includes a protective layer PL (e.g., an optically clear adhesive layer or an oxygen moisture prevention layer) on a side of the electrochromic layer EC away from the first conductive layer CL1. Optionally, the light modulator further includes a second base substrate BS2 on a side of the protective layer PL away from the second conductive layer CL2.

In some embodiments, the one or more processors P (e.g., a microcontroller) are configured to transmit a first signal (e.g., driving voltage adjustment instructions) to the first power source based on a driving mode for a present interval, and transmit a second signal (e.g., driving voltage adjustment instructions) to the second power source based on a predicted driving mode for a next interval. Upon receiving the first signal from the one or more processors P, the first power source is configured to adjust voltages required for adjusting brightness of the light emitted from the display panel according to the driving mode for the present interval, thereby adjusting the brightness of the light emitted from the display panel in the present interval. Upon receiving the second signal from the one or more processors P, the second power source is configured to be pre-set to voltages required for adjusting brightness of the light emitted from the display panel according to the predicted driving mode for the next interval.

Figure 10:
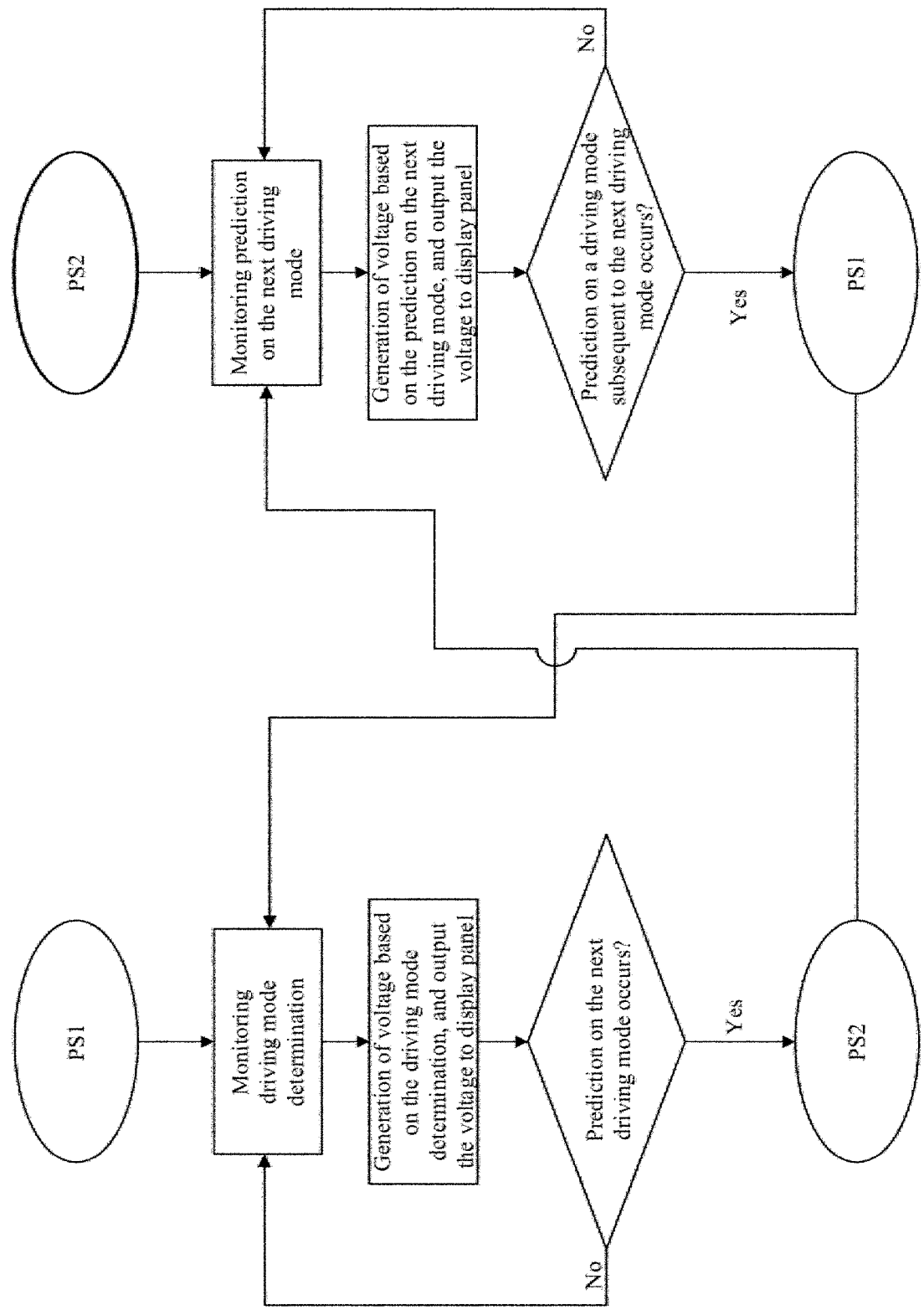
FIG. 10 is a schematic diagram illustrating brightness driving signal initiation by an adaptive control device in some embodiments according to the present disclosure.

FIG. 10 is a schematic diagram illustrating brightness driving signal initiation by an adaptive control device in some embodiments according to the present disclosure. Referring to FIG. 10, the adaptive control device includes two power sources for driving adaptive adjustment. In some embodiments, the one or more processors are configured to determine a driving mode for a present interval of the plurality of intervals. Upon determination of the driving mode for the present interval ("Monitoring driving mode determination"), the one or more processors are configured to transmit a first signal (e.g., driving voltage adjustment instructions) to the first power source PS1 (e.g., a first power management integrated circuit). The first power source PS1 is configured to generate a voltage based on the first signal, and output the voltage to the display panel for adjusting brightness of light emitted from the display panel.

In some embodiments, the one or more processors are further configured to predict a driving mode for a next interval. Referring to FIG. 10, when prediction on the driving mode for the next interval does not occur, the one or more processors are configured to determine an updated driving mode for the next interval of the plurality of intervals. Upon determination of the updated driving mode for the next interval ("Monitoring driving mode determination"), the one or more processors are configured to transmit a first updated signal (e.g., driving voltage adjustment instructions) to the first power source PS1. The first power source PS1 is configured to generate a voltage based on the first updated signal, and output the voltage to the display panel for adjusting brightness of light emitted from the display panel.

Referring to FIG. 10, when prediction on the driving mode for the next interval occurs, the second power source PS2 (e.g., a second power management integrated circuit) takes over. In some embodiments, the one or more processors are configured to, consistent with the prediction, determine a driving mode for the next interval of the plurality of intervals. Upon determination of the driving mode for the next interval ("Monitoring prediction on the next driving mode"), the one or more processors are configured to transmit a second signal (e.g., driving voltage adjustment instructions) to the second power source PS2. The second power source PS2 is configured to generate a voltage based on the second signal, and output the voltage to the display panel for adjusting brightness of light emitted from the display panel.

In some embodiments, the one or more processors are further configured to predict a driving mode subsequent to the driving mode for the next interval. For example, the driving mode for the next interval is a k-th driving mode in a k-th interval, and the driving mode subsequent to the driving mode for the next interval is a (k+1)-th driving mode in a (k+1)-th interval, k being an integer equal to or greater than two.

Referring to FIG. 10, when prediction on the driving mode subsequent to the driving mode for the next interval does not occur, the one or more processors are configured to determine an updated driving mode subsequent to the driving mode for the next interval. Upon determination of the updated driving mode subsequent to the driving mode for the next interval, the one or more processors are configured to transmit a second updated signal (e.g., driving voltage adjustment instructions) to the second power source PS2. The second power source PS2 is configured to generate a voltage based on the second updated signal, and output the voltage to the display panel for adjusting brightness of light emitted from the display panel.

Referring to FIG. 10, when prediction on the driving mode subsequent to the driving mode for the next interval occurs, the first power source PS1 takes over. In some embodiments, the one or more processors are configured to, consistent with the prediction, determine a driving mode subsequent to the driving mode for the next interval. Upon determination of the driving mode subsequent to the driving mode for the next interval, the one or more processors are configured to transmit an updated signal (e.g., driving voltage adjustment instructions) to the first power source PS1. The first power source PS1 is configured to generate a voltage based on the updated signal, and output the voltage to the display panel for adjusting brightness of light emitted from the display panel.

The brightness driving signal initiation may be reiterated according to the process describe in FIG. 10 and associated texts.

In some embodiments, the one or more processors (e.g., a microcontroller) are configured to transmit a signal (e.g., driving voltage adjustment instructions) to the third power source and/or the fourth power source based on a driving mode for a present interval and/or a predicted driving mode for a next interval. Upon receiving the signal, the third power source and/or the fourth power source are configured to output voltages required for adjusting the light transmission rate of the light modulator according to the driving mode for the present interval and/or the predicted driving mode for the next interval, thereby adjusting the light transmission rate of the light modulator in the present interval and/or the next interval.

Figure 11:
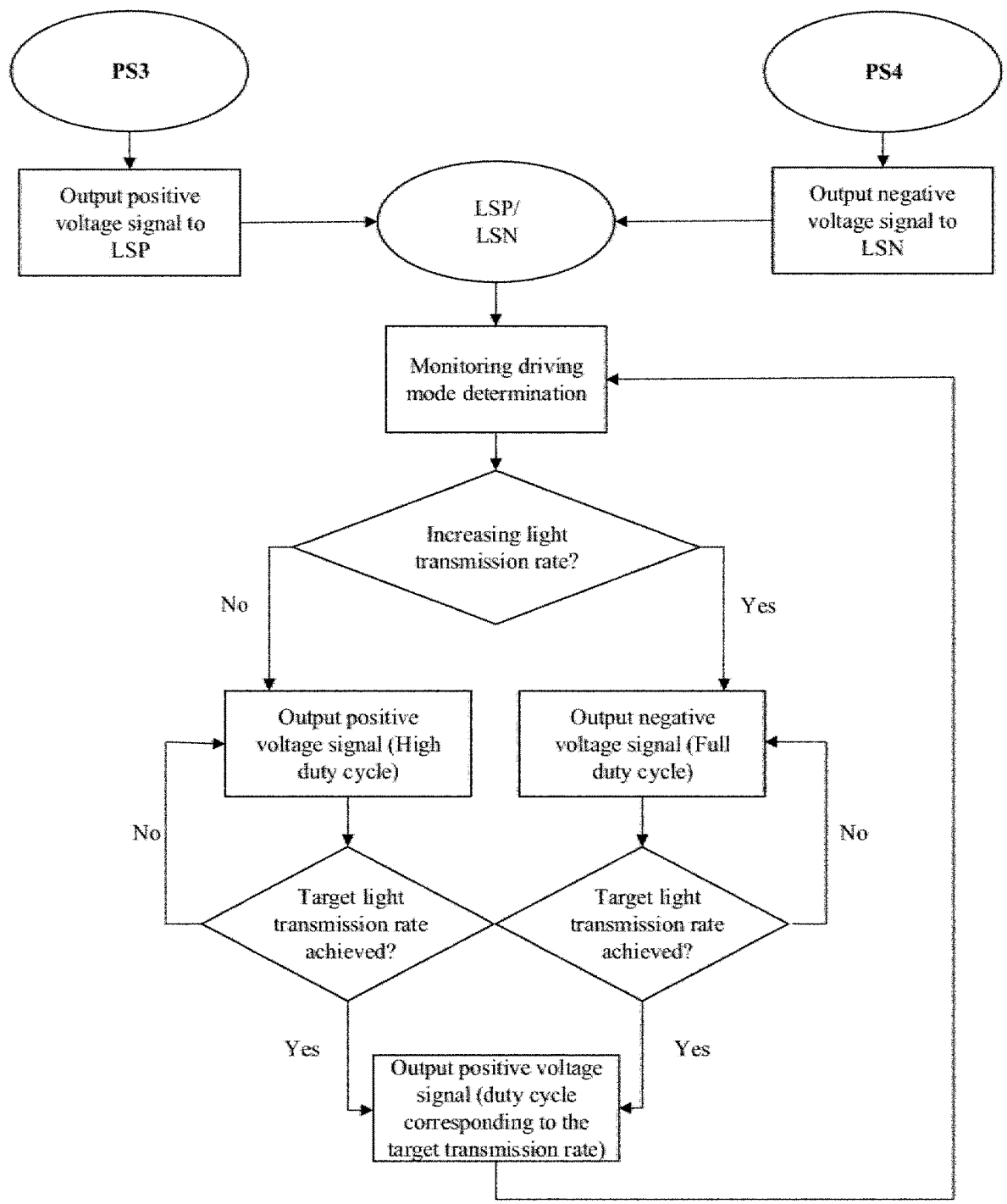
FIG. 11 is a schematic diagram illustrating light transmission rate driving signal initiation by an adaptive control device in some embodiments according to the present disclosure.

FIG. 11 is a schematic diagram illustrating light transmission rate driving signal initiation by an adaptive control device in some embodiments according to the present disclosure. Referring to FIG. 11, upon receiving the signal, the third power source PS3 is configured to output a positive voltage signal to the third power source load switch LSP, and the fourth power source PS4 is configured to output a negative voltage signal to the fourth power source load switch LSN. In some embodiments, the one or more processors are configured to determine a driving mode for a present interval of the plurality of intervals. In one example, the third power source load switch LSP and the fourth power source load switch LSN are a same load switch. In an alternative example, the third power source load switch LSP and the fourth power source load switch LSN are two different load switches.

Upon determination of the driving mode for the present interval ("Monitoring driving mode determination"), and when the driving mode for the present interval requires an increase in light transmission rate of the light modulator, the one or more processors are configured to control the fourth power source load switch LSN to allow a negative voltage signal output from the fourth power source PS4 to pass to the light modulator (e.g., to the first conductive layer of the light modulator), thereby increasing light transmission rate of the electrochromic layer EC depicted in FIG. 9. Optionally, the negative voltage signal has a full duty cycle.

In some embodiments, when a target light transmission rate of the light modulator is achieved, the one or more processors are configured to control the fourth power source load switch LSN to allow a positive voltage signal output from the fourth power source PS4 to pass to the light modulator, wherein the positive voltage signal has a duty cycle required to maintain the target light transmission rate.

Upon determination of the driving mode for the present interval ("Monitoring driving mode determination"), and when the driving mode for the present interval requires a decrease in light transmission rate of the light modulator, the one or more processors are configured to control the third power source load switch LSP to allow a positive voltage signal output from the third power source PS3 to pass to the light modulator (e.g., to the first conductive layer of the light modulator), thereby decreasing light transmission rate of the electrochromic layer EC depicted in FIG. 9. Optionally, the positive voltage signal has a relatively high duty cycle, e.g., higher than a duty cycle required to maintain the target light transmission rate.

In some embodiments, when a target light transmission rate of the light modulator is achieved, the one or more processors are configured to control the third power source load switch LSP to allow a positive voltage signal output from the third power source PS3 to pass to the light modulator, wherein the positive voltage signal has a duty cycle required to maintain the target light transmission rate.

Table 3 shows a correlation between duty cycle and light transmission rate in one example according to the present disclosure.

| Duty cycle (voltage = 1.8 V) | Light transmission rate |
| --- | --- |
| 10% | 80% |
| 20% | 70% |
| 40% | 60% |
| 50% | 50% |
| 60% | 40% |
| 70% | 30% |
| 80% | 20% |
| 90% | 10% |
| 100% | 5% |
| 100% (−1.8 V) | 90% |

Figure 12:
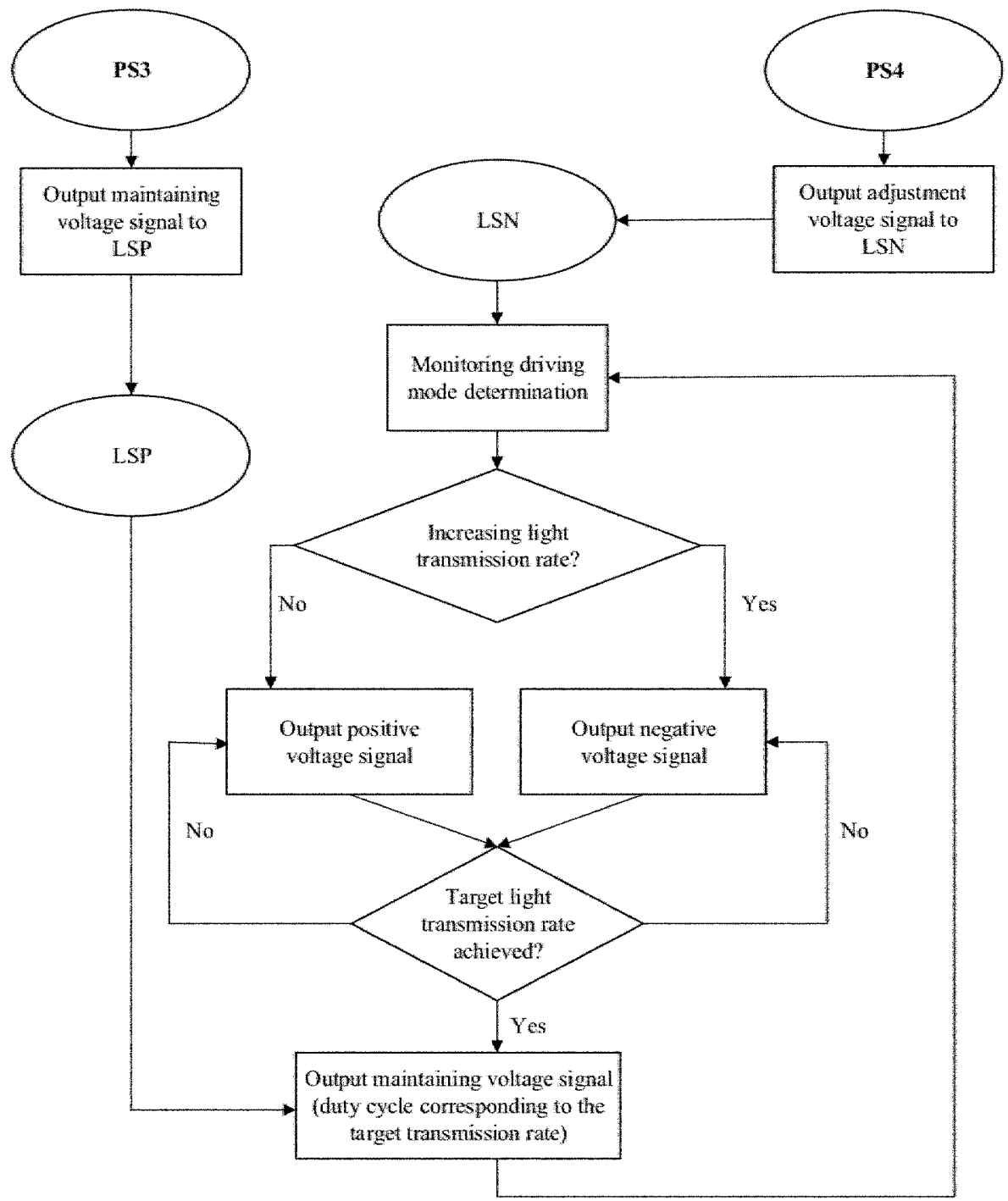
FIG. 12 is a schematic diagram illustrating light transmission rate driving signal initiation by an adaptive control device in some embodiments according to the present disclosure.

FIG. 12 is a schematic diagram illustrating light transmission rate driving signal initiation by an adaptive control device in some embodiments according to the present disclosure. Referring to FIG. 12, in some embodiments, the third power source PS3 is configured to output a maintaining voltage signal to the third power source load switch LSP. The one or more processors are configured to control the third power source load switch LSP to allow the maintaining voltage signal output from the third power source PS3 to pass to the light modulator (e.g., to the first conductive layer of the light modulator), thereby maintaining light transmission rate of the light modulator at a target light transmission rate.

In some embodiments, the one or more processors (e.g., a microcontroller) are configured to transmit a signal (e.g., driving voltage adjustment instructions) to the fourth power source based on a driving mode for a present interval and/or a predicted driving mode for a next interval. Upon receiving the signal, the fourth power source is configured to output voltages required for adjusting the light transmission rate of the light modulator according to the driving mode for the present interval and/or the predicted driving mode for the next interval, thereby adjusting the light transmission rate of the light modulator in the present interval and/or the next interval.

In some embodiments, referring to FIG. 12, upon receiving the signal, the fourth power source PS4 is configured to output an adjustment voltage signal to the fourth power source load switch LSN. In some embodiments, the one or more processors are configured to determine a driving mode for a present interval of the plurality of intervals. Upon determination of the driving mode for the present interval ("Monitoring driving mode determination"), and when the driving mode for the present interval requires an increase in light transmission rate of the light modulator, the one or more processors are configured to control the fourth power source load switch LSN to allow a negative voltage signal output from the fourth power source PS4 to pass to the light modulator (e.g., to the first conductive layer of the light modulator), thereby increasing light transmission rate of the electrochromic layer EC depicted in FIG. 9.

In some embodiments, when a target light transmission rate of the light modulator is achieved, the one or more processors are configured to control the fourth power source load switch LSN to disconnect the fourth power source PS4 from the light modulator; control the third power source PS3 to output an updated maintaining voltage; and control the third power source load switch to allow the updated maintaining voltage signal from the third power source PS3 to pass to the light modulator, thereby maintaining an updated light transmission rate of the light modulator. The updated maintaining voltage signal has a duty cycle required to maintain the updated light transmission rate.

Upon determination of the driving mode for the present interval ("Monitoring driving mode determination"), and when the driving mode for the present interval requires a decrease in light transmission rate of the light modulator, the one or more processors are configured to control the fourth power source load switch LSN to allow a positive voltage signal output from the fourth power source PS4 to pass to the light modulator (e.g., to the first conductive layer of the light modulator), thereby decreasing light transmission rate of the electrochromic layer EC depicted in FIG. 9.

In some embodiments, when a target light transmission rate of the light modulator is achieved, the one or more processors are configured to control the fourth power source load switch LSN to disconnect the fourth power source PS4 from the light modulator; control the third power source PS3 to output an updated maintaining voltage; and control the third power source load switch to allow the updated maintaining voltage signal from the third power source PS3 to pass to the light modulator, thereby maintaining an updated light transmission rate of the light modulator. The updated maintaining voltage signal has a duty cycle required to maintain the updated light transmission rate.

In some embodiments, during outputting the adjustment voltage signal output from the fourth power source PS4 to the light modulator, the one or more processors are further configured to simultaneously control the third power source PS3 to output the updated maintaining voltage; and control the third power source load switch to allow the updated maintaining voltage signal from the third power source PS3 to pass to the light modulator.

By having the light transmission rate driving signal initiation depicted in FIG. 12, the light transmission rate adjustment may be performed smoother, enhancing the user viewing experience.

In some embodiments, the one or more processors P (e.g., a microcontroller) are configured to transmit a third signal (e.g., driving voltage adjustment instructions) to the third power source based on a driving mode for a present interval, and transmit a fourth signal (e.g., driving voltage adjustment instructions) to the fourth power source based on a predicted driving mode for a next interval. Upon receiving the third signal from the one or more processors P, the third power source is configured to adjust voltages required for adjusting light transmission rate of the light modulator according to the driving mode for the present interval, thereby adjusting the light transmission rate of the light modulator in the present interval. Upon receiving the fourth signal from the one or more processors P, the fourth power source is configured to be pre-set to voltages required for adjusting the light transmission rate of the light modulator according to the predicted driving mode for the next interval.

Figure 13:
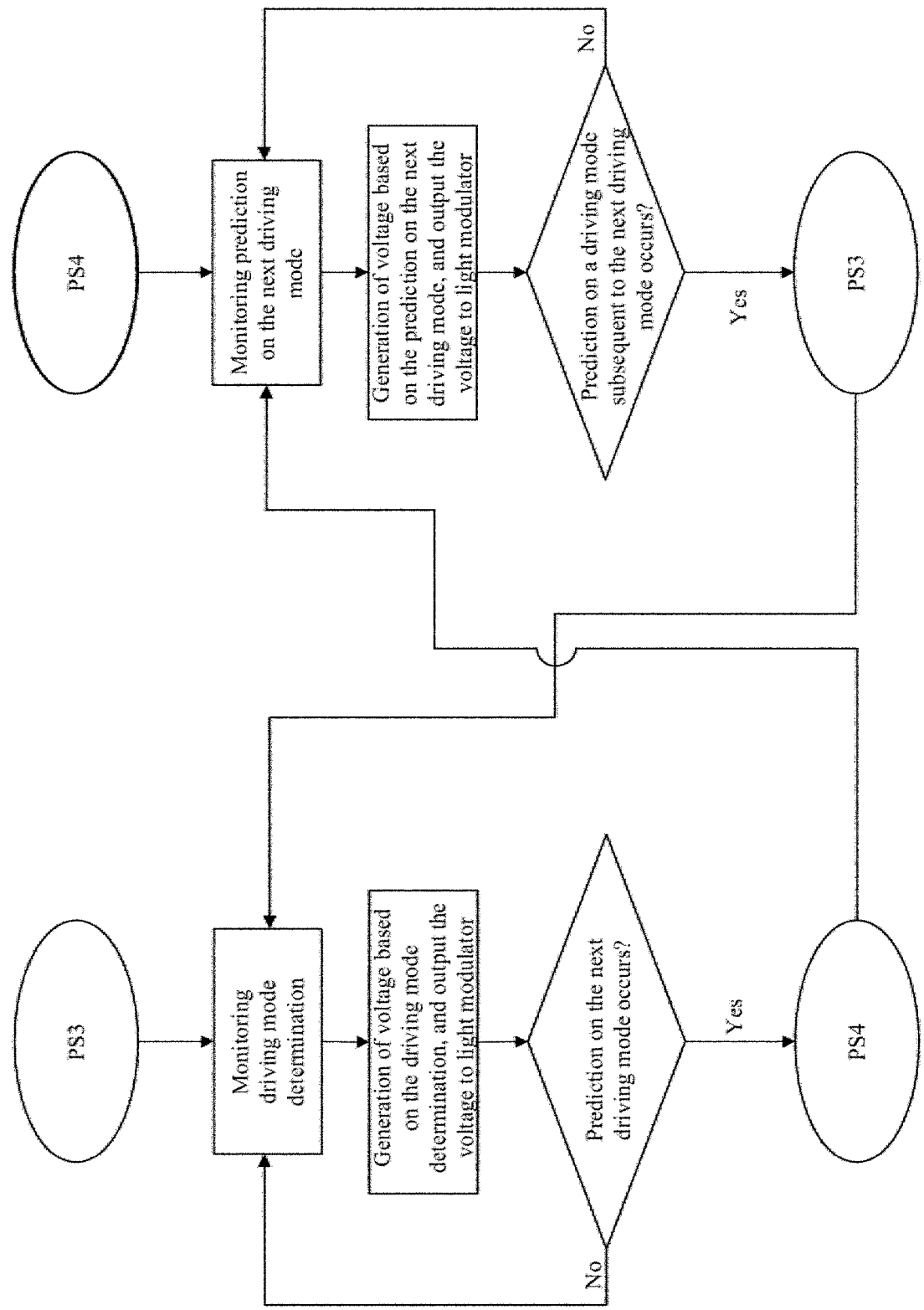
FIG. 13 is a schematic diagram illustrating light transmission rate driving signal initiation by an adaptive control device in some embodiments according to the present disclosure.

FIG. 13 is a schematic diagram illustrating light transmission rate driving signal initiation by an adaptive control device in some embodiments according to the present disclosure. Referring to FIG. 13, the adaptive control device includes two power sources for driving adaptive adjustment. In some embodiments, the one or more processors are configured to determine a driving mode for a present interval of the plurality of intervals. Upon determination of the driving mode for the present interval ("Monitoring driving mode determination"), the one or more processors are configured to transmit a third signal (e.g., driving voltage adjustment instructions) to the third power source PS3. The third power source PS3 is configured to generate a voltage based on the third signal, and output the voltage to the light modulator for adjusting the light transmission rate of the light modulator.

In some embodiments, the one or more processors are further configured to predict a driving mode for a next interval. Referring to FIG. 13, when prediction on the driving mode for the next interval does not occur, the one or more processors are configured to determine an updated driving mode for the next interval of the plurality of intervals. Upon determination of the updated driving mode for the next interval ("Monitoring driving mode determination"), the one or more processors are configured to transmit a third updated signal (e.g., driving voltage adjustment instructions) to the third power source PS3. The third power source PS3 is configured to generate a voltage based on the third updated signal, and output the voltage to the light modulator for adjusting the light transmission rate of the light modulator.

Referring to FIG. 13, when prediction on the driving mode for the next interval occurs, the fourth power source PS4 takes over. In some embodiments, the one or more processors are configured to, consistent with the prediction, determine a driving mode for the next interval of the plurality of intervals. Upon determination of the driving mode for the next interval ("Monitoring prediction on the next driving mode"), the one or more processors are configured to transmit a fourth signal (e.g., driving voltage adjustment instructions) to the fourth power source PS4. The fourth power source PS4 is configured to generate a voltage based on the fourth signal, and output the voltage to the light modulator for adjusting the light transmission rate of the light modulator.

In some embodiments, the one or more processors are further configured to predict a driving mode subsequent to the driving mode for the next interval. For example, the driving mode for the next interval is a k-th driving mode in a k-th interval, and the driving mode subsequent to the driving mode for the next interval is a (k+1)-th driving mode in a (k+1)-th interval, k being an integer equal to or greater than two.

Referring to FIG. 13, when prediction on the driving mode subsequent to the driving mode for the next interval does not occur, the one or more processors are configured to determine an updated driving mode subsequent to the driving mode for the next interval. Upon determination of the updated driving mode subsequent to the driving mode for the next interval, the one or more processors are configured to transmit a fourth updated signal (e.g., driving voltage adjustment instructions) to the fourth power source PS4. The fourth power source PS4 is configured to generate a voltage based on the fourth updated signal, and output the voltage to the light modulator for adjusting the light transmission rate of the light modulator.

Referring to FIG. 13, when prediction on the driving mode subsequent to the driving mode for the next interval occurs, the third power source PS3 takes over. In some embodiments, the one or more processors are configured to, consistent with the prediction, determine a driving mode subsequent to the driving mode for the next interval. Upon determination of the driving mode subsequent to the driving mode for the next interval, the one or more processors are configured to transmit an updated signal (e.g., driving voltage adjustment instructions) to the third power source PS3. The third power source PS3 is configured to generate a voltage based on the updated signal, and output the voltage to the light modulator for adjusting the light transmission rate of the light modulator.

The light transmission rate of the light modulator driving signal initiation may be reiterated according to the process describe in FIG. 13 and associated texts.

The present adaptive control device is capable of sensing ambient light intensity in real time, and is capable of predicting ambient light intensity in a next time period. Moreover, the present adaptive control device can effectively and adaptively control brightness of light emitted from the display panel and light transmission rate of the light modulator in real time. The present adaptive control device integrates sensing, processing, driving, and adjusting into a highly intelligent system, and the adaptive control device itself can be effectively integrated into a display apparatus, e.g., an augmented reality display apparatus, making the display apparatus suitable for use in various scenarios. By having the present adaptive control device, the viewing experience of the user can be significantly improved.

In another aspect, the present disclosure provides a display apparatus including the adaptive control device described herein, a display panel coupled to the adaptive control device, and a light modulator coupled to the adaptive control device. Examples of appropriate display apparatuses include, but are not limited to, an electronic paper, a mobile phone, a tablet computer, a television, a monitor, a notebook computer, a digital album, a GPS, etc.

In some embodiments, the display apparatus is an augmented reality display apparatus.

In another aspect, the present disclosure provides a wearable apparatus including the display apparatus described herein. In some embodiments, the wearable apparatus is an augmented reality google. In some embodiments, the wearable apparatus is an augmented reality helmet.

In another aspect, the present disclosure provides an adaptive control method. In some embodiments, the adaptive control method includes coupling one or more sensors to one or more processors; coupling one or more power sources to the one or more processors; detecting, by a plurality of photosensors, ambient light intensities at a plurality of sampling orientations with respect to one or more view zones, respectively; detecting, by the one or more position sensors, a reference angular position of the adaptive control device; and determining, by the one or more processors, a true orientation from which ambient light intensity signals are detected at a respective time point based on information on the plurality of sampling orientations with respect to one or more view zones, respectively, and the reference angular position of the adaptive control device.

In some embodiments, the adaptive control method further includes coupling the one or more power sources to a light modulator; and determining, by the one or more processors, a driving mode for a present interval of a plurality of intervals. Optionally, the driving mode for a present interval is selected from a plurality of candidate driving modes. Optionally, the plurality of candidate driving modes include adjusting brightness of light emitted from the display panel, adjusting light transmission rate of the light modulator coupled to the adaptive control device, and adjusting both the brightness of light emitted from the display panel and the light transmission rate of the light modulator.

In some embodiments, the adaptive control method further includes predicting, by the one or more processors, a driving mode for a next interval of a plurality of intervals; driving, by a first set of power sources, adjustment in a present interval of the plurality of intervals; and pre-setting a second set of power sources to a state for driving adjustment in the next interval.

In some embodiments, the adaptive control method further includes transmitting, by the one or more processors, a first signal to a first power source of the one or more power sources based on a driving mode for a present interval, and transmitting, by the one or more processors, a second signal to a second power source of the one or more power sources based on a predicted driving mode for a next interval; upon receiving the first signal from the one or more processors by the first power source, adjusting voltages required for adjusting brightness of the light emitted from the display panel or light transmission rate of a light modulator according to the driving mode for the present interval, thereby adjusting the brightness of the light emitted from the display panel or the light transmission rate of the light modulator in the present interval; and upon receiving the second signal from the one or more processors by the second power source, pre-setting the second power source to voltages required for adjusting the brightness of the light emitted from the display panel or the light transmission rate of the light modulator according to the predicted driving mode for the next interval.

In some embodiments, the adaptive control method further includes, when prediction on the driving mode for the next interval does not occur, determining, by the one or more processors, an updated driving mode for the next interval; upon determination of the updated driving mode for the next interval, transmitting, by the one or more processors, a first updated signal to the first power source; generating, by the first power source, a voltage based on the first updated signal; and outputting, by the first power source, the voltage to the display panel for adjusting brightness of light emitted from the display panel or to the light modulator for adjusting the light transmission rate of the light modulator.

In some embodiments, the adaptive control method further includes, when prediction on the driving mode for the next interval occurs, determining, by the one or more processors, a driving mode for the next interval consistent with the prediction; upon determination of the driving mode for the next interval, transmitting, by the one or more processors, a second signal to the second power source; generating, by the second power source, a voltage based on the second signal; and outputting, by the second power source, the voltage to the display panel for adjusting brightness of light emitted from the display panel or to the light modulator for adjusting the light transmission rate of the light modulator.

In some embodiments, the adaptive control method further includes predicting, by the one or more processors, a driving mode subsequent to the driving mode for the next interval; when prediction on the driving mode subsequent to the driving mode for the next interval does not occur, determining, by the one or more processors, an updated driving mode subsequent to the driving mode for the next interval; upon determination of the updated driving mode subsequent to the driving mode for the next interval, transmitting, by the one or more processors, a second updated signal to a second power source; generating, by the second power source, a voltage based on the second updated signal; and outputting, by the second power source, the voltage to the display panel for adjusting brightness of light emitted from the display panel.

In some embodiments, the adaptive control method further includes predicting, by the one or more processors, a driving mode subsequent to the driving mode for the next interval; when prediction on the driving mode subsequent to the driving mode for the next interval occurs, determining, by the one or more processors, a driving mode subsequent to the driving mode for the next interval consistent with the prediction; upon determination of the driving mode subsequent to the driving mode for the next interval, transmitting, by the one or more processors, a third updated signal to a first power source; generating, by the first power source, a voltage based on the third updated signal; and outputting, by the first power source, the voltage to the display panel for adjusting brightness of light emitted from the display panel.

In some embodiments, the adaptive control method further includes transmitting, by the one or more processors, a signal to the one or more power sources based on driving mode for a present interval and/or a predicted driving mode for a next interval; and upon receiving the signal by the one or more power sources, outputting a voltage signal required for adjusting the light transmission rate of the light modulator according to the driving mode for the present interval and/or the predicted driving mode for the next interval, thereby adjusting the light transmission rate of the light modulator in the present interval and/or the next interval.

In some embodiments, the adaptive control method further includes determining, by the one or more processors, a driving mode for a present interval of the plurality of intervals; upon determination the driving mode for the present interval requires an increase in light transmission rate of the light modulator, generating, by the one or more power sources, a negative voltage signal; and outputting, by the one or more power sources, the negative voltage signal to the light modulator to increase the light transmission rate of the light modulator.

In some embodiments, the adaptive control method further includes, when a target light transmission rate of the light modulator is achieved, generating, by the one or more power sources, a positive voltage signal and output the positive voltage signal to the light modulator. Optionally, the positive voltage signal has a duty cycle required to maintain the target light transmission rate.

In some embodiments, the adaptive control method further includes determining, by the one or more processors, a driving mode for a present interval of the plurality of intervals; upon determination the driving mode for the present interval requires a decrease in light transmission rate of the light modulator, generating, by the one or more power sources, a first positive voltage signal; and outputting, by the one or more power sources, the first positive voltage signal to the light modulator to decrease the light transmission rate of the light modulator.

In some embodiments, the adaptive control method further includes, when a target light transmission rate of the light modulator is achieved, generating, by the one or more power sources, a second positive voltage signal; and outputting, by the one or more power sources, the second positive voltage signal to the light modulator. Optionally, the second positive voltage signal has a duty cycle required to maintain the target light transmission rate. Optionally, the first positive voltage signal has a duty cycle higher than the duty cycle of the second positive voltage signal.

In some embodiments, the adaptive control method further includes generating, by a third power source of the one or more power sources, a positive voltage signal; outputting, by the third power source, the positive voltage signal to the light modulator to decrease the light transmission rate of the light modulator; generating, by a fourth power source of the one or more power sources, a negative voltage signal; and outputting, by the fourth power source, the negative voltage signal to the light modulator to increase the light transmission rate of the light modulator.

In some embodiments, the adaptive control method further includes generating, by a third power source of the one or more power sources, a maintaining voltage signal; outputting, by the third power source, the maintaining voltage signal to the light modulator to maintain the light transmission rate of the light modulator at a target light transmission rate; outputting, by a fourth power source of the one or more power sources, voltages required for adjusting the light transmission rate of the light modulator according to the driving mode for the present interval and/or the predicted driving mode for the next interval, thereby adjusting the light transmission rate of the light modulator in the present interval and/or the next interval In some embodiments, the adaptive control method further includes deriving, by the one or more processors, a denoised ambient light intensity in a respective interval of a plurality of intervals. Optionally, the respective interval includes I number of sampling intervals. Optionally, a respective sampling interval of the I number of sampling intervals includes J number of sampling sub-intervals, I and J being a positive integer. Optionally, the adaptive control method further includes calculating, by the one or more processors, I number of arithmetic mean ambient light intensities of the I number of sampling intervals, respectively; calculating, by the one or more processors, a weighted mean of the I number of arithmetic mean ambient light intensities based on a total number of ambient light intensity values used for calculating a respective arithmetic mean ambient light intensity in each of the I number of sampling intervals.

In some embodiments, the adaptive control method further includes establishing an azimuth matrix; mapping denoised ambient light intensities to the azimuth matrix, thereby establishing an ambient light intensity domain of a scene in which the adaptive control device is located; obtaining information of the respective time point at which a respective ambient light intensity signal is collected by a respective photosensor of the one or more photosensors; and mapping the respective ambient light intensity signal to the azimuth matrix by identifying the respective time point at which the respective ambient light intensity signal is collected and at which a reference angular position data signal is collected by the one or more position sensors.

In some embodiments, the adaptive control method further includes predicting, by the one or more processors, a driving mode for a next interval of a plurality of intervals based on images of historically viewed contents stored in the adaptive control device and an image of currently viewed contents; predicting, by the one or more processors, a content that the user is likely to view in the next interval, and configured to predict a gaze direction of the user in the next interval based on prediction of the content that the user is likely to view in the next interval; and based on the gaze direction predicted, predicting, by the one or more processors, an ambient light intensity in the next interval.

In another aspect, the present disclosure provides a computer-program product comprising a non-transitory tangible computer-readable medium having computer-readable instructions thereon. In some embodiments, the computer-readable instructions being executable by a processor to cause the processor to perform causing a plurality of photosensors to detect ambient light intensities at a plurality of sampling orientations with respect to one or more view zones, respectively; causing one or more position sensors to detect a reference angular position of the adaptive control device; and causing one or more processors to determine a true orientation from which ambient light intensity signals are detected at a respective time point based on information on the plurality of sampling orientations with respect to one or more view zones, respectively, and the reference angular position of the adaptive control device.

Various illustrative operations described in connection with the configurations disclosed herein may be implemented as electronic hardware, computer software, or combinations of both. Such operations may be implemented or performed with a general purpose processor, a digital signal processor (DSP), an ASIC or ASSP, an FPGA or other programmable logic device, discrete gate or transistor logic, discrete hardware components, or any combination thereof designed to produce the configuration as disclosed herein. For example, such a configuration may be implemented at least in part as a hard-wired circuit, as a circuit configuration fabricated into an application-specific integrated circuit, or as a firmware program loaded into non-volatile storage or a software program loaded from or into a data storage medium as machine-readable code, such code being instructions executable by an array of logic elements such as a general purpose processor or other digital signal processing unit. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. A software module may reside in a non-transitory storage medium such as RAM (random-access memory), ROM (read-only memory), nonvolatile RAM (NVRAM) such as flash RAM, erasable programmable ROM (EPROM), electrically erasable programmable ROM (EEPROM), registers, hard disk, a removable disk, or a CD-ROM; or in any other form of storage medium known in the art. An illustrative storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The foregoing description of the embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. An adaptive control device, comprising:
   one or more processors;
   one or more sensors coupled to the one or more processors; and
   one or more power sources coupled to the one or more processors;
   wherein the one or more power sources are coupled to a display panel;
   wherein the one or more sensors comprise:
   a plurality of photosensors configured to detect ambient light intensities at a plurality of sampling orientations with respect to one or more view zones, respectively; and
   one or more position sensors configured to detect a reference angular position of the adaptive control device;
   wherein the one or more processors are configured to determine a true orientation from which ambient light intensity signals are detected at a respective time point based on information on the plurality of sampling orientations with respect to one or more view zones, respectively, and the reference angular position of the adaptive control device.

2. The adaptive control device of claim 1, wherein the one or more processors are further configured to determine a driving mode for a present interval of a plurality of intervals;
   the one or more power sources are further coupled to a light modulator;
   the driving mode for a present interval is selected from a plurality of candidate driving modes;
   the plurality of candidate driving modes comprise adjusting brightness of light emitted from the display panel, adjusting light transmission rate of the light modulator coupled to the adaptive control device, and adjusting both the brightness of light emitted from the display panel and the light transmission rate of the light modulator.

3. The adaptive control device of claim 1, wherein the one or more processors are further configured to predict a driving mode for a next interval of a plurality of intervals;
   wherein the one or more power sources comprises:
   a first set of power sources configured to drive adjustment in a present interval of the plurality of intervals; and
   a second set of power sources configured to be pre-set to a state for driving adjustment in the next interval.

4. The adaptive control device of claim 3, wherein the one or more processors are further configured to predict a driving mode subsequent to the driving mode for the next interval;
   when prediction on the driving mode subsequent to the driving mode for the next interval does not occur, the one or more processors are configured to determine an updated driving mode subsequent to the driving mode for the next interval;
   upon determination of the updated driving mode subsequent to the driving mode for the next interval, the one or more processors are configured to transmit a second updated signal to a second power source; and
   the second power source is configured to generate a voltage based on the second updated signal, and output the voltage to the display panel for adjusting brightness of light emitted from the display panel.

5. The adaptive control device of claim 3, wherein the one or more processors are further configured to predict a driving mode subsequent to the driving mode for the next interval;
- when prediction on the driving mode subsequent to the driving mode for the next interval occurs, the one or more processors are configured to, consistent with the prediction, determine a driving mode subsequent to the driving mode for the next interval;
- upon determination of the driving mode subsequent to the driving mode for the next interval, the one or more processors are configured to transmit a third updated signal to a first power source; and
- the first power source is configured to generate a voltage based on the third updated signal, and output the voltage to the display panel for adjusting brightness of light emitted from the display panel.

6. The adaptive control device of claim 1, wherein the one or more processors are further configured to transmit a first signal to a first power source of the one or more power sources based on a driving mode for a present interval, and transmit a second signal to a second power source of the one or more power sources based on a predicted driving mode for a next interval;
- wherein, upon receiving the first signal from the one or more processors, the first power source is configured to adjust voltages required for adjusting brightness of the light emitted from the display panel or light transmission rate of a light modulator according to the driving mode for the present interval, thereby adjusting the brightness of the light emitted from the display panel or the light transmission rate of the light modulator in the present interval; and
- upon receiving the second signal from the one or more processors, the second power source is configured to be pre-set to voltages required for adjusting the brightness of the light emitted from the display panel or the light transmission rate of the light modulator according to the predicted driving mode for the next interval.

7. The adaptive control device of claim 6, wherein, when prediction on the driving mode for the next interval does not occur, the one or more processors are configured to determine an updated driving mode for the next interval;
- upon determination of the updated driving mode for the next interval, the one or more processors are configured to transmit a first updated signal to the first power source; and
- the first power source is configured to generate a voltage based on the first updated signal, and output the voltage to the display panel for adjusting brightness of light emitted from the display panel or to the light modulator for adjusting the light transmission rate of the light modulator.

8. The adaptive control device of claim 6, wherein, when prediction on the driving mode for the next interval occurs, the one or more processors are configured to, consistent with the prediction, determine a driving mode for the next interval;
- upon determination of the driving mode for the next interval, the one or more processors are configured to transmit a second signal to the second power source; and
- the second power source is configured to generate a voltage based on the second signal, and output the voltage to the display panel for adjusting brightness of light emitted from the display panel or to the light modulator for adjusting the light transmission rate of the light modulator.

9. The adaptive control device of claim 1, wherein the one or more processors are further configured to transmit a signal to the one or more power sources based on driving mode for a present interval and/or a predicted driving mode for a next interval; and
- upon receiving the signal, the one or more power sources are configured to output a voltage signal required for adjusting a light transmission rate of a light modulator according to the driving mode for the present interval and/or the predicted driving mode for the next interval, thereby adjusting the light transmission rate of the light modulator in the present interval and/or the next interval.

10. The adaptive control device of claim 9, wherein the one or more power sources comprises a third power source and a fourth power source;
- the third power source is configured to generate a positive voltage signal and output the positive voltage signal to the light modulator to decrease the light transmission rate of the light modulator; and
- the fourth power source is configured to generate a negative voltage signal and output the negative voltage signal to the light modulator to increase the light transmission rate of the light modulator.

11. The adaptive control device of claim 9, wherein the one or more power sources comprises a third power source and a fourth power source;
- the third power source is configured to generate a maintaining voltage signal and output the maintaining voltage signal to the light modulator to maintain the light transmission rate of the light modulator at a target light transmission rate; and
- the fourth power source is configured to output voltages required for adjusting the light transmission rate of the light modulator according to the driving mode for the present interval and/or the predicted driving mode for the next interval, thereby adjusting the light transmission rate of the light modulator in the present interval and/or the next interval.

12. The adaptive control device of claim 1, wherein the one or more processors are further configured to determine a driving mode for a present interval of the plurality of intervals; and
- upon determination the driving mode for the present interval requires an increase in light transmission rate of the light modulator, the one or more power sources are configured to generate a negative voltage signal and output the negative voltage signal to the light modulator to increase the light transmission rate of the light modulator.

13. The adaptive control device of claim 12, wherein, when a target light transmission rate of the light modulator is achieved, the one or more power sources are configured to generate a positive voltage signal and output the positive voltage signal to the light modulator; and
- the positive voltage signal has a duty cycle required to maintain the target light transmission rate.

14. The adaptive control device of claim 1, wherein the one or more processors are further configured to determine a driving mode for a present interval of the plurality of intervals; and
- upon determination the driving mode for the present interval requires a decrease in light transmission rate of the light modulator, the one or more power sources are configured to generate a first positive voltage signal and output the first positive voltage signal to the light modulator to decrease the light transmission rate of the light modulator.

15. The adaptive control device of claim 14, wherein when a target light transmission rate of the light modulator is achieved, the one or more power sources are configured to generate a second positive voltage signal and output the second positive voltage signal to the light modulator;
- the second positive voltage signal has a duty cycle required to maintain the target light transmission rate; and
- the first positive voltage signal has a duty cycle higher than the duty cycle of the second positive voltage signal.

16. The adaptive control device of claim 1, wherein the one or more processors are further configured to derive a denoised ambient light intensity in a respective interval of a plurality of intervals;
- the respective interval comprises I number of sampling intervals;
- a respective sampling interval of the I number of sampling intervals comprises J number of sampling sub-intervals, I and J being a positive integer; and
- the one or more processors are further configured to calculate I number of arithmetic mean ambient light intensities of the I number of sampling intervals, respectively; and configured to calculate a weighted mean of the I number of arithmetic mean ambient light intensities based on a total number of ambient light intensity values used for calculating a respective arithmetic mean ambient light intensity in each of the I number of sampling intervals.

17. The adaptive control device of claim 1, wherein the one or more processors are further configured to:
- establish an azimuth matrix, and configured to map denoised ambient light intensities to the azimuth matrix, thereby establishing an ambient light intensity domain of a scene in which the adaptive control device is located;
- obtain information of the respective time point at which a respective ambient light intensity signal is collected by a respective photosensor of the plurality of photosensors; and
- map the respective ambient light intensity signal to the azimuth matrix by identifying the respective time point at which the respective ambient light intensity signal is collected and at which a reference angular position data signal is collected by the one or more position sensors.

18. The adaptive control device of claim 1, wherein the one or more processors are further configured to predict a driving mode for a next interval of a plurality of intervals based on images of historically viewed contents stored in the adaptive control device and an image of currently viewed contents;
- the one or more processors are configured to predict a content that a user is likely to view in the next interval, and configured to predict a gaze direction of the user in the next interval based on prediction of the content that the user is likely to view in the next interval; and
- based on the gaze direction predicted, the one or more processors are configured to predict an ambient light intensity in the next interval.

19. A display apparatus, comprising the adaptive control device of claim 1, a display panel coupled to the adaptive control device, and a light modulator coupled to the adaptive control device.

20. An adaptive control method, comprising:
- coupling one or more sensors to one or more processors;
- coupling one or more power sources to the one or more processors;
- detecting, by a plurality of photosensors, ambient light intensities at a plurality of sampling orientations with respect to one or more view zones, respectively;
- detecting, by one or more position sensors, a reference angular position; and
- determining, by the one or more processors, a true orientation from which ambient light intensity signals are detected at a respective time point based on information on the plurality of sampling orientations with respect to one or more view zones, respectively, and the reference angular position.

* * * * *